United States Patent Office 3,411,369
Patented Nov. 19, 1968

3,411,369
TRACTIVE FLUIDS AND METHOD OF USE
William C. Hammann, Creve Coeur, and Robert M. Schisla, Kirkwood, Mo., assignors to Monsanto Company, St. Louis, Mo., a corporation of Delaware
No Drawing. Continuation-in-part of application Ser. No. 586,370, Oct. 13, 1966. This application Aug. 15, 1967, Ser. No. 660,575
37 Claims. (Cl. 74—200)

ABSTRACT OF THE DISCLOSURE

Improvements in tractive drives are afforded through use of certain fused, saturated, carbon-containing compounds as the fluid component thereof. The tractive fluids of this invention, when disposed on the tractive surfaces, provide increased traction as compared to conventional fluids. The tractive fluids disclosed herein are defined by limitations on chemical structure.

---

This application is a continuation-in-part of our copending application, Ser. No. 586,370, filed Oct. 13, 1966.

Traction is broadly defined as the adhesive friction of a body on a surface on which it moves. Tractive devices, as considered in light of the present invention, are those devices in which torque is transmitted through nominal point or line contact, typically with a rolling action. Although sometimes referred to as friction drives, such devices are more appropriately described as tractive drives. A tractive drive, in simplified form, could comprise two parallel cylindrical rollers in tangential contact, one roller being the input member and the other the output member. The torque capacity of such a tractive drive is a direct function of the contact pressure between the rollers and the coefficient of traction of the roller surfaces. The phrase "coefficient of traction" is preferred instead of "coefficient of friction" in order to connote rolling contact.

The traction existing at the rolling contacts of ball and roller bearings, although considered detrimental in most applications, can be used to transmit tangential force. If the coefficient of traction and the normal load on the rolling bodies are sufficient to prevent slipping, any ball or roller bearing can serve as a prototype of a tractive drive.

A distinguishing feature of tractive drives is that torque is generally transmitted therein from one member to another member by traction generated through nominal point or line contact. This is in contrast with a true friction drive such as an automotive friction clutch or a belt drive where torque is transmitted through area contact. When point contact or line contact are referred to herein, the term nominal is employed to signify that the actual contact area is something greater than that of a point or a line.

To further distinguish tractive drives from friction drives, consider the definition of friction. Friction is defined as the resistance to relative motion between two bodies in contact. In friction drives, a high resistance to relative motion is desired. Thus, advantage is taken of the resistance to relative motion of two or more bodies in contact to provide means for transmitting torque. In friction drives, therefore, it is desirable, under stabilized speed conditions, to have a high coefficient of friction, thus minimizing or avoiding any rolling or sliding contact between members; whereas, tractive drives, as defined above, intentionally incorporate some form of relative motion between the load carrying members, and this relative motion is not in the form of slippage. A familiar example of a friction drive comprises an input member and an output member having mating wedged surfaces wherein the surface material possesses a high coefficient of friction. The surface material can be fiber, asbestos, leather, etc. Increased torque capacity is achieved therein by tighter wedging of the members, the latter being engaged with area contact and having no slippage or relative motion therebetween.

The rolling contact principle has been employed to produce tractive drives far more complex than the double roller example hereinbefore cited. Infinitely variable ratios can be obtained with many tractive drive units. Typical uses for tractive drives are in automatic transmissions in automotive vehicles, variable speed drives for machinery, constant speed drives for aircraft accessories, and power transmission units for land and marine vehicles. In machine shop equipment, for example, there are many requirements for variable speed drives such as in feed control and cutting speed control on lathes, cylindrical grinders, boring mills, milling machines, drilling machines, etc.

One variable speed tractive drive with a 5 horsepower rating and speed ratios between 3:1 and 5:1 has found use in the textile industry as well as the machine tool industry. A miniature tractive drive has been designed for extremely low-power applications, e.g., in cardiographs, computers, optical drives, oscillographs, timers, servomechanisms, and process controllers.

There are at least seven basic drives which can be employed in the design of infinitely variable tractive devices. These drives are categorized in the following manner:

(1) Disc and sliding-roller type, with full reversibility.
(2) Double-disc and sliding-roller type, reversible by changing contact from one disc to the other.
(3) Two discs interconnected by a sliding roller.
(4) Cone and sliding-roller type.
(5) Two spherical cones and free-spinning roller.
(6) Spherical cones and tilting balls.
(7) Toroidal discs and tilting rollers.

Although the above elements would normally be metal, a tractive drive comprising non-metallic elements such as reinforced fiber, hard rubber, or plastics such as nylon, modified styrenebutadiene copolymers, polycarbonates, etc., would be useable.

There are many commercial embodiments of tractive devices comprising the aforementioned drives. One configuration features a floating steel ring rolling on two steel double cones. One cone of each double cone can be displaced axially, while the other is rigidly attached to its respective shaft. The ring, therefore, can occupy any position between the maximum and minimum diameters of the cones, providing infinitely variable output speeds between these limits. Line-contact pressure between the ring and the cones develops automatically and is proportional to the load.

Another tractive drive configuration is similar to that of a compound planetary-gear system, except that the non-rotating member is a traction ring which engages tapered rollers at varying diameters. The traction or control ring can be moved axially to change speed. The rollers are supported in a carrier, and are inclined at an angle equal to their taper, so that their outer edges are maintained parallel to the central axis. The required tractive pressure between rollers and ring is obtained through the centrifugal force of the rollers themselves.

Several tractive drives employing toroidal discs and tilting rollers have been made. In each case there are several rollers loaded between an input toroidal disc and an output toroidal disc, the rollers being capable of rotation into various angular positions to change the speed ratio. The toroidal disc and roller units can be compounded in a tractive drive assembly.

Still another commercial tractive drive employs a series of tilting balls in contact with two spherical cone members. The balls are drilled through their centers to receive spindles which facilitate tilting. When the cones act on equal diameters of the balls, the input and output speeds are equal. However, when the axes of the balls are tilted, one cone will operate on a reduced ball diameter and the other on an increased ball diameter. The balls can be tilted in either direction, giving an overall infinitely variable ratio of 9:1.

Another variable speed device which could be considered as a tractive drive is a roller chain drive in which power is transmitted by traction between a special wedge-type roller chain and smooth conical wheels. In one embodiment of this drive, each link of the chain contains cylindrical rollers with convex or sherical ends, which, in the direction of travel, bear against the enclosing cage-like side bars of the links, but which are free to rotate about their principal axis. When the chain enters the wheels, the rollers of each link wedge themselves tightly into the V's formed by the conical wheels, the roller ends carrying out a rotary motion on the working surfaces of the wheel and on their own lines of contact.

Yet another tractive drive within the scope of this invention features stacks of flanged discs and tapered discs in power transmitting relationship. A thin film of fluid is provided between the driving and driven discs. Output speed is varied by changing the depth to which the flanged discs are inserted between the tapered discs, thereby altering the effective diameter of the tapered discs, while that of the flanged discs remains constant.

While numerous embodiments of tractive drives have been described above, it is to be understood that the present invention is directed to all types of relatively rotatable members in torque transmitting relationship where the coefficient of traction has significance. Thus, there is no limitation herein to particular types or classes of tractive devices in the mechanical sense.

Among the advantages of tractive drives are smooth and quiet operation, positive mechanical drive, high efficiency, continually variable ratio under load, and simplicity. In contrast to the more conventional drives, both torque and speed can be transmitted uniformly by tractive drives, with no torsional pulsations. This smoothness is especially valuable since this is basically a positive mechanical drive wherein the nominal overall ratio is determined by the geometry of the rolling bodies and is only slightly affected by elastic creep in the contacts. Furthermore, overall efficiencies well above 90% can be achieved for tractive drives having both rolling and spinning in the contacts. For drives having pure rolling contact, efficiencies of 99% are known. This latter figure is the same as or better than the efficiency of a pair of helical gears of the same power capacity.

One of the most important characteristics of tractive drives is their ability to change ratio continually under full load without power interruption during ratio changing. This characteristic cannot be achieved with gear drives and is obtained in certain types of hydraulic drives only at a substantial sacrifice in efficiency. Tractive drives can be designed so that the output speed for a given input speed is infinitely variable between some set maximum and minimum limits, between some maximum limit and zero, or between some maximum limit and beyond zero in the range of reverse speeds. The external forces required to bring about a ratio change can be very small compared to the magnitude of the power transmitted, thus making tractive drives very attractive for servo-type control systems. Still another advantage lies in the easily machineable shape of the contacting elements.

Tractive drives have some recognized limitations, the most significant of which are torque capacity and durability. Since transmittable power depends on the magnitude of the traction, and this traction in turn depends on the force applied at the point of contact, specific contact pressure must be very high if power output is substantial. This high pressure tends to reduce the fatigue life of the tractive drive components. Although this problem can be partially overcome by the provision of more than one contact point or by nominal line contact, the torque capacity of tractive drives for a given physical size is still less than desired, and this deficiency severely limits the widespread use of tractive drives.

The magnitude of the tangential force which is transmitted through a given rolling contact is directly proportional to the product of the normal load acting on the contact and the coefficient of traction existing between the two bodies. If it is assumed that the effect of tangential load on the life of rolling contacts is small relative to the effect of normal load, the fatigue life of a tractive drive can be estimated from rolling contact bearing data obtained under similar loads. Thus, the life of a rolling contact element is inversely proportional to approximately the cube of the normal load whereas the torque capacity is only directly proportional to the normal load. Increasing the torque capacity through increasing the coefficient of traction, therefore, is far more desirable than by increasing the normal load.

While tractive elements are commonly spoken of as being in contact, it is generally accepted that a fluid film is provided therebetween. Almost all tractive drives require fluids to remove heat, to prevent wear at the contact surfaces, and to lubricate bearings and other moving parts associated with the drive. Thus, instead of metal-to-metal rolling contact, there is a film of fluid introduced into the load zone. The nature of this fluid has a profound effect on the coefficient of traction of the drive.

The coefficient of traction for a tractive device can be defined as the ratio of the tangential or tractive force to the normal load. The upper limiting value of the coefficient of traction is the coefficient of traction at slip, which is observed when the rolling contact is on the verge of gross slip. In a given tractive drive, coefficient of traction can be computed by knowing the normal load on the contact and by simultaneously measuring the tractive force. An expression for coefficient of traction is:

$$f_t = \frac{F_t}{P_n}$$

where $F_t$=tangential or tractive force, $P_n$=normal load, and $f_t$=coefficient of traction.

Experimental work on tractive drives has shown that the coefficient of traction is affected by rolling velocity, normal load on the contacts, fluid composition, fluid temperature, and roller surface topography. Since fluid composition is considered to be the key variable of the group for the purpose of effecting improvements in the torque capacity of a given tractive device, coefficients of traction are herein assigned to the fluids themselves by comparative test means in order to properly classify their tractive merits. Hence, when a coefficient of traction is ascribed to a fluid, it is a relative measure of the tractive effect of that fluid in a tractive device.

Inherent in any tractive drive are certain load limitations based on the physical size of the parts, on design numbers, and metallurgical characteristics. To obtain a reasonable fatigue life on the working parts, therefore, a definite torque limit must be established and thereafter adhered to. Many factors must be evaluated in arriving at a safe torque limit, or more specifically, a safe normal load. Careful consideration must be given to measuring the coefficient of traction of the fluid to be employed therein. Some variation in tractive properties among different batches of a given fluid would be expected, hence a factor of safety should be provided in the normal load limit to compensate therefor.

Another factor bearing on the normal load limit concerns spin losses. Spin losses, or torque losses, are inherent in any variable ratio tractive drive. These are attributed to the relative rotation, about an axis perpendicular to the contact zone, between the contact zone on one tractive member and the corresponding zone on the mating member. Spin losses increase with increasing normal load. Hence, better efficiency will be attained if the normal load can be reduced while maintaining the desired output torque, and this can be achieved with a fluid having an increased coefficient of traction.

From the standpoint of potential improvement in torque capacity, the key component of a tractive drive is the tractive drive fluid, and the key property of the fluid is its coefficient of traction. The advantages of finding fluids with increased coefficients of traction have been recognized for some time by those engaged in the development of tractive devices, and they have expended considerable effort for this purpose. These efforts, however, have been confined to the evaluation of commercially available petroleum oil fractions, synthetic oils and oil additives for the purpose of finding fluids with improved coefficients of traction and other desired properties, such as viscosity, lubricity, oxidation stability, anticorrosion, and anti-foaming. The lubricants hitherto available for tractive applications, however, do not possess those properties which produce the high coefficient of traction necessary for improved torque capacity, and these efforts have not led to practical fluids with coefficients of traction substantially superior to those of the best petroleum oil fractions. Hence, the torque capacity of known tractive drives is lower than that which is desired for many commercial applications.

In addition to efforts to obtain fluids having increased coefficients of traction by the evaluation of available oils, much theoretical and experimental work reported in the technical literature in recent years has been devoted to obtaining an understanding of tractive drives and rolling contact phenomena which could lead to the design of fluids of improved coefficient of traction. Although such an understanding of the properties which control the coefficient of traction of a fluid has not as yet been achieved, certain basic phenomena have been recognized in the region where two fluid-coated roller surfaces traveling on one another come nearest to touching. When the rollers are stationary and under load, these surfaces are substantially in contact over a small, essentially planar area determined by the geometries and elastic moduli of the rollers. The dimensions of this area and the pressure distribution existing therein can be calculated from these parameters by the well-known equations of Hertz, and the area is generally known as the Hertzian region.

When the rollers are rotating and under load, this motion draws fluid through this region which, as shown by optical, X-ray, and capacitance measurements, causes the surfaces to become separated by a thin, wedge-shaped layer of fluid tapering toward the trailing edge of the contact area and having an average thickness generally exceeding the sum of the heights of the surface asperities of the rollers. The thickness of this layer and the pressure and temperature distribution therein can be approximated by cylindrical rollers by recently developed computational techniques.

The tractive fluid passes through the Hertzian region in an extremely short time and is subjected therein to extremely high pressures, which are determined by the elastic deformation of the rollers, and which cause the viscosity of the fluid to increase greatly. Further, because of the extreme thinness of the liquid layer, even slight slippage between the rollers results in high rates of shear being developed in the liquid. The suddenness with which a fluid becomes compressed within the Hertzian region, the high pressures and viscosities found there, and the high rates of shear all point up the desirability of considering the rheology of such fluids, when trying to assess their tractive properties. Success in clearly relating rheological properties to tractive behavior has thus far, however, been meager, and no theory has yet been proposed which can be usefully applied to the design of fluids with improved coefficients of traction.

In view of the scope of the previous effort, both empirical and theoretical, which has been devoted without success to improving the tractive capacity of fluids to be used in tractive drives, the present invention has contributed remarkable advancements over the prior art through the discovery of fluids having outstanding tractive properties. Because of their increased coefficients of traction, the fluids of the present invention serve to counteract a major disadvantage of contemporary tractive drives, viz, limited torque capacity. With the availability of these fluids, certain economic benefits also accrue. For example, the physical size of the load carrying members of an existing tractive drive unit can be reduced as a result of these fluids, while still maintaining the same torque capacity and life of parts. Conversely, by maintaining the same physical size and utilizing these fluids, greater torque capacity is made available without diminishing the life of the working parts. If the unit size is kept the same and the torque load is not elevated, the utilization of these improved tractive fluids serves to prolong the life of parts because the normal load becomes less.

The magnitude of economic benefits attainable through use of the present invention can be readily illustrated. For example, test data will be hereinafter presented to show that some of these fluids have coefficients of traction more than 30% greater than that of the best tractive fluids of the prior art. Generally speaking, a 30% increase in coefficient of traction of a fluid allows approximately a 30% decrease in the size of the tractive device in which it is employed, while maintaining the same performance. Such a size reduction affords a substantial manufacturing cost savings on metal requirements alone; and handling of the tractive device is simplified by the reduced weight and the diminished space requirements. Tractive drives employing these fluids, therefore, can now be used in applications where they were heretofore excluded by reasons of cost, bulk, or weight.

It is an object of the present invention, therefore, to provide certain fluids which have been found to be superior for tractive drives.

Another object of this invention is to provide certain classes of fluids having coefficients of traction substantially higher than that of fluids presently available for tractive drives.

Still another object of the present invention is to provide tractive drives of increased torque capacity through the use of improved tractive fluids.

Yet another object of the present invention is to permit reduction in size of existing tractive drives through the use of improved tractive fluids.

Other objects and advantages will become apparent from a consideration of the accompanying disclosure and the appended claims.

In accordance with this invention, it has been found that certain fused, saturated compounds are useful as the fluid or fluid base stock for tractive devices of the types described above. More particularly, the materials of this invention are those organic compounds:

(1) Having from 2 to 9 fused, saturated, carbon-containing rings, and (2) Having about 9 to about 60 carbon atoms, up to eight of which can be replaced by atoms other than carbon atoms and can be selected from such atoms as oxygen, nitrogen, phosphorus and silicon.

Thus, a remarkable achievement of the present invention is the discovery that certain saturated fused ring systems provide fluids having outstanding tractive properties. Although the fused ring compounds of this invention exhibit a wide range of tractive coefficients, a preferred class hereunder includes those tractive fluids which exhibit a coefficient of traction of at least 0.06 in a test machine to be hereinafter described. Exemplary fluids of the present invention exhibiting high coefficients of traction are cis-decalin, perhydrofluorene, perhydrofluoranthene, perhydrophenanthrene, and perhydrocyclopentadiene trimer.

Outstanding results with fused ring systems have been achieved where at least one of the rings contains at least 6 member atoms. The member atoms, of course, are not necessarily all carbon atoms, but can be selected from such atoms as oxygen, nitrogen, phosphorus and silicon. Examples of typical fused ring compounds useful as tractive fluids in this invention are as follows:

*Two fused rings.*—N-cyclohexylperhydroquinoline, hydrindane, decalin, 3 - cyclopropylnorcarane, N - cyclohexylperhydroquinoline, perhydrobenzofuran, bis(2 - perhydroisoquinolenyl) methane, octahydro - N - methylindole, spiro[5.] undecane, bicyclo[6.4.0] - dodecane, and 2-cyclohexyl bicyclo[2.2.1]heptane.

*Three fused rings.*—Perhydrobiprenylene, perhydroacenaphthene, perhydrofluorene, perhydroperinaphthene, perhydrophenanthrene, perhydroanthracene, N-methylperhydrobenzoquinoline, N-cyclohexylperhydrocarbazole, N-isopropylperhydroacridine, perhydrodibenzopyran, N,N'-dimethylperhydro-1,7-phenanthroline, tricyclo[7.1.0.0$^{4,6}$] decane, tricyclo[10.4.0.0$^{2,7}$]hexadecane, tricyclo[4.4.4. 0$^{1,6}$]tetradecane, 2,2-dimethyltricyclo[8.4.0.0$^{4,9}$] - 2-sila-tetradecane, 2-methyltricyclo[8.7.0.0$^{4,9}$]-1-aza-2-phospha-tetradecane, diisopropylperhydrodibenzofuran, and 1-ethyl 3,5,7-trimethyltricyclo[3.3.1.1$^{3,7}$]decane.

*Four fused rings*—Perhydrofluoroanthene, perhydropyrene, perhydrobenzanthrene, perhydrocyclopentaphenanthrene, perhydrotriphenylene, perhydrochrysene, perhydro-3,4-benzophenanthrene, perhydro-1,2,4,5-dibenzopentalene, perhydropyracene, and 2,2,6,10 - tetramethyltricyclo[5.3.1.0$^{3,7}$]undecane.

*Five fused rings.*—Perhydrocholanthrene, perhydroperylene, perhydromethylcholanthrene, perhydro-11,12-benzofluoranthene, perhydro - 4,5 - o - phenylenefluoranthene, perhydro-1,2,5,6-dibenzanthracene, perhydro(2.1:1. 2)perinaphthene, pentacyclo[6.5.1.1$^{3,6}$.0$^{2,7}$.0$^{9,13}$]pentadecane, and perhydropicene.

*Six fused rings.*—Perhydro-4,5 - o - phenylenefluoranthene, perhydro-1.2-benzoperylene, perhydro-1.2,3.4-dibenzopyrene, and perhydro-9.10,11.12-dibenzofluoranthene.

*Seven fused rings.*—Perhydro - 2,3,10.11 - dibenzoperylene, perhydrohexaphenylene, perhydrorubicene, and heptacyclo[9.6.1.1$^{3,9}$.1$^{13,16}$.0$^{2,10}$.0$^{4,8}$.0$^{12,17}$]eicosane.

*Eight fused rings.*—Perhydrobisanthene and perhydro-2.3,6.7-di(peri-naphthylene)naphthalene.

*Nine fused rings.*—Perhydrooctaphenylene, perhydro-7.8-benzoterrylene, and nonacyclo[10.9.1$^{3,10}$.1$^{5,8}$.1$^{14,20}$. 0$^{2,11}$.0$^{4,4}$.0$^{13,21}$.0$^{15,19}$]pentacosane.

*Ten fused rings.*—Perhydrodecacyclene.

While it may be noted that many of the compounds specifically disclosed herein are essentially cyclic in nature and do not contain substituent groups, it is to be understood that certain substituent groups can be present without detracting from the usefulness of such compounds. Typical examples of the substituents which can be present (so long as the total atom requirement is satisfied) include aliphatic radicals, for example, alkyl radicals, e.g., methyl, ethyl, n-propyl, isopropyl, n-butyl, sec-butyl isobutyl tert-butyl sec-amyl, isoamyl, tert-amyl; hexyl radicals, e.g., 2,2 - dimethyl - 3 - butyl, 2,2-dimethyl-4-butyl, 2,3-dimethyl-2-butyl; heptyl radicals, e.g., 2,2,3-trimethyl-3-butyl; octyl radicals, e.g., diisobutyl; nonyl radicals; decyl radicals; dodecyl radicals; tetradecyl radicals; hexadecyl radicals; octadecyl radicals; and other branched alkyl radicals having the formula $C_nH_{2n+1}$; alkenyl radicals, e.g., propenyl radicals, e.g., allyl, isopropenyl; butenyl radicals, e.g., n-butenyl-1, n-butenyl-2, n-butenyl-3, isobutenyl; pentenyl radicals; hexenyl radicals, e.g., 4,4-dimethylbutenyl-2, 3,4 - dimethylbutenyl - 1; heptenyl radicals; octenyl radicals, e.g., diisobutenyl; nonenyl radicals; decenyl radicals; dodecenyl radicals, e.g., triisobutenyl and other branched alkenyl radicals having the formula $C_nH_{2n-1}$; cycloaliphatic radicals, for example, cycloalkyl radicals, e.g., cyclopentyl, alkylated-cyclopentyl, cyclohexyl and alkylated-cyclohexyl radicals, e.g., mono- and polymethylcyclopentyl radicals, mono- and polymethylcyclohexyl radicals, mono- and polyethylcyclo-hexyl radicals, mono- and polyisopropylcyclohexyl radicals, mono- and poly - tert - amylcyclohexyl radicals, diisobutylcyclohexyl (i.e., tert-octylcyclohexyl) radicals, nonylcyclohexyl radicals; cycloalkenyl radicals, e.g., cyclopentenyl, alkylated cyclopentenyl, cyclohexenyl and alkylated cyclohexenyl radicals, e.g., mono- and polymethylcyclopentenyl radicals, mono- and polymethylcyclohexenyl radicals, mono- and polyethylcyclohexenyl radicals, mono- and polyisopropylcyclohexenyl radicals, diisobutylcyclohexenyl radicals, nonylcyclohexenyl radicals; cycloalkyl-substituted aliphatic radicals, for example, phenyl, alkylphenyl, phenylalkyl and alkylphenylalkyl radicals, e.g., tolyl, phenylethyl, isopropylphenyl, cumyl, benzyl, dimethylbenzyl; cyclohexyl- and alkylcyclohexyl-substituted alkyl radicals, e.g., cyclohexylethyl, methylcyclohexylethyl, ethylcyclohexylethyl, cyclohexylpropyl, tert-butyl-cyclohexylbutyl.

Additionally, the fused ring compounds of this invention can have oxygen-containing substituents such as alkoxy, alkoxyalkyl, cycloalkoxy, cycloalkoxyalkoxy, alkoxycycloalkyl, cycloalkoxycycloalkyl, alkenoxy, cycloalkoxyalkenyl and alkenoxyalkenyl as well as alkenoxyalkyl. Illustrative examples of the substituents in such materials include oxygen-containing aliphatic radicals, e.g., alkoxy-substituted alkyl radicals, e.g., propoxyethyl radicals, e.g., n-propoxyethyl, isopropoxyethyl; butoxyethyl radicals, e.g., n-butoxyethyl, isobutoxyethyl, tert-butoxyethyl; octoxyethyl radicals, e.g., diisobutoxyethyl; dibutoxypropyl radicals, e.g., 2,3-di-n-butoxypropyl, 3,3-diisobutoxypropyl; dioctoxypropyl radicals, e.g., 2,3-bis(diisobutoxy)propyl; cycloalkoxy-substituted alkyl radicals, e.g., cyclohexoxymethyl, cyclohexoxyethyl radicals, e.g., $\beta$-cyclohexoxyethyl, $\alpha$-cyclohexoxyethyl; cyclohexoxybutyl radicals, e.g., 2-(cyclohexoxy)butyl, 2,3-dicyclohexoxybutyl; methylcyclohexoxypropyl radicals, e.g., 2-(2-methylcyclohexoxy)propyl, 2 - (4 - methylcyclohexoxy)propyl; butylcyclohexoxyethyl radicals, e.g., $\beta$-(4-tert-butylcyclohexoxy)ethyl, $\alpha$-(2 - sec - butylcyclohexoxy)ethyl; cyclopentoxyethyl radicals, e.g., -cyclopentoxyethyl, -cyclopentoxyethyl; propylcyclopentoxymethyl radicals, e.g., isopropyl cyclopentoxymethyl radicals, n-propyl cyclopentoxymethyl radicals; alkenoxy-substituted alkyl radicals, e.g., propenoxyethyl radicals, e.g., allyloxy ethyl, isopropenoxyethyl; octenoxyethyl radicals, e.g., diisobutenoxyethyl; dioctenoxypropyl radicals, e.g., 2,3-bis(diisobutenoxy)propyl; oxygen-containing cycloaliphatic radicals, e.g., alkoxy-, alkenoxy- and aroxy-substituted cycloalkyl radicals, e.g., alkoxy-substituted cyclopentyl radicals, e.g., mono- and polyethoxycyclopentyl, octoxycyclopentyl radicals, e.g., diisobutoxycyclopentyl; alkoxy-substituted cyclohexyl radicals; e.g., mono- and polymethoxycyclohexyl, octoxycyclohexyl radicals, e.g., diisobutoxycyclohexyl; alkenoxy-substituted cyclopentyl radicals, e.g., propenoxycyclopentyl radicals, e.g., isopropenoxycyclopentyl; alkenoxy-substituted cyclohexyl radicals, e.g., vinyloxycyclohexyl, propenoxycyclohexyl radicals, e.g., isopropenoxycyclohexyl; octenoxycyclohexyl radicals, e.g., diisobutenoxycyclohexyl; aroxy-substituted cyclopentyl radicals, e.g., phenoxycyclopentyl and toloxycyclopentyl; aroxy-substituted cyclohexyl radicals, e.g., phenoxycyclohexyl and toloxycyclohexyl; propyl-phenoxycyclohexyl radicals, e.g., isopropyl-phenoxycyclohexyl radicals; carboalkoxyalkyl radicals $$(R-O\overset{O}{\underset{\|}{C}}-R'-)$$

e.g., carbomethoxymethyl, $$(CH_3-O-\overset{O}{\underset{\|}{C}}-CH_2-)$$

carboethoxyethyl; carboalkoxycycloalkyl radicals, e.g., carboethoxycyclopentyl.

Elements other than or in addition to oxygen can be present such as alkyl radicals containing silicon, e.g.,

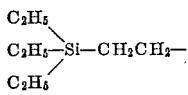

Cycloalkyl radicals containing silicon, e.g.,

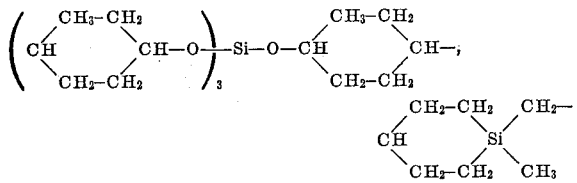

The scope of the present invention extends to mixtures of any two or more of the compounds hereinbefore described. Also, it has been found desirable to use viscosity index (VI) improvers with some of these tractive fluids in order to meet the temperature-viscosity requirements for certain tractive drive uses. It is to be understood that materials other than VI improvers in minor amounts, such as antioxidants, rust inhibitors, seal swellers, antifoam additives, antiwear additives, anticorrosion additives, dispersants, dyes, and other useful substances can also be incorporated in the tractive fluids of the present invention.

To compare the tractive properties of various fluids, it is necessary to provide a standard of measurement. Numerous methods and techniques have been devised for measuring the coefficient of traction where a fluid film separates rolling contact surfaces. Since these techniques differ with respect to principle of operation and method of measurement, ideal correlation in relative or absolute magnitude of the data is not obtainable throughout. Consistent results, however, have been demonstrated with certain types of test machines, and these have been successfully employed for comparative evaluations.

The technical literature includes a description of one test machine which utilizes thrust-loaded ball bearings in determining coefficient of traction. See "Effect of Lubricant Composition on Friction as Measured With Thrust Ball Bearings" by F. G. Rounds [J. Chem. and Eng. Data, vol. 5, No. 4, p. 499 (1960)]. This machine measures the torque transmitted from a central drive shaft to a torque arm through two thrust ball bearings which are submerged in the test fluid. The bearings are shaftmounted and can be rotated while being subjected to an axial thrust load. Thrust loads are applied hydraulically or by compressing calibrated Belleville springs. A tachometer geared to the drive shaft measures the rotational speed. Thermocouples located within 1/8 inch of the balls of the test bearings measure the test fluid temperature which is held constant at various predetermined temperatures by heating or cooling the jacket fluid in a housing surrounding the test chamber.

The individual balls tend to spin on an axis parallel to the principal bearing axis as well as roll around the raceway. As a result, both rolling and sliding actions contribute to the traction. The output torque is measured with the torque arm which is fitted between the two bearings. This measured torque is then interpreted in terms of coefficient of traction for the fluid being evaluated. The coefficients obtained from this test machine are relatable to those measured in actual tractive drives. Hence, the machine is effective for screening candidate fluids.

The procedure for evaluating the tractive properties of a fluid on the above machine consists of breaking in a new set of ball bearings in the test fluid and then measuring the torque transmitted through the bearings as a function of load, speed and fluid temperature. To eliminate the possibility of carry-over from one fluid to the next, a new set of bearings is used for each test. During break-in, the machine is operated at the test loads and temperatures until stabilized traction values are obtained, which requires from several minutes to several hours, depending on the test fluid.

When coefficients of traction are quoted in the description of the present invention and in the claims appended thereto, it is to be understood that except where otherwise indicated, these coefficients are based upon the thrust bearing test machine method of measurement referred to above, and at the test conditions of Table I, infra. Studies of data repeatability with this machine using hydraulic loading means have shown that, for the same test fluid at given test conditions, the standard deviation of each measured coefficient of traction is generally less than 3% of its value.

To corroborate the traction data presented in Table I, infra, most of the compounds enumerated therein were also tested on a rolling disc machine, a device to be described hereinafter in detail. In general, good correlation was obtained between the thrust bearing traction values and the rolling disc traction values.

In the technical paper on the thrust bearing machine, cited supra, test results were presented on mineral oils, synthetic oils, and mineral oils containing additives. The synthetic fluids tested included fatty acids, alcohols, esters, silicones, and halogenated compounds such as chlorinated biphenyl. Among the additives were acids and alcohols, sulfur and chlorine compounds, nitrogen compounds, phosphorus compounds, and metal organic compounds. It was shown that both the base oil and the type of additive have a pronounced effect on traction. Naphthenic based oils, for example, gave higher traction values than paraffinic based oils.

In general, the coefficient of traction decreases as oil temperature, ball velocity, or load increases, according to results obtained from the thrust bearing test machine. For a meaningful comparison of various fluids with respect to tractive properties, therefore, standard test conditions must be applied. Data presented in the paper cited above were taken at a fluid temperature of 200° F. and under an average Hertz stress of 400,000 p.s.i. The term "Hertz stress" refers to the nominal compressive stress in the load zone. Linear ball velocity was varied from 0 to 600 feet per minute. Using the results obtained at 600 feet per minute, the coefficients of traction measured on the thrust bearing machine were in the broad range of 0.004 to 0.061 for all the fluids explored therein. No coefficient in excess of 0.061 was demonstrated. The maximum coefficient of 0.061 was obtained using a trifluorochloroethylene polymer. Another synthetic lubricant, a fluoroalkyl camphorate, displayed a coefficient of traction of 0.058. The coefficients of other synthetic lubricants, such as silicones and diesters, fell approximately within the mineral oil range of 0.035 and 0.055. Fused ring compounds were not considered in the aforementioned technical paper.

The outstanding tractive properties of the fused ring compounds of this invention were demonstrated on the thrust bearing test machine hereinbefore described. Except for ball velocity, test conditions were the same as in the technical paper cited above. Fluid temperature was maintained at 200° F., the Hertz stress was 400,000 p.s.i., and the linear ball velocity was 750 feet per minute. The slightly higher velocity employed under the present test conditions reduces the apparent improvement over the prior art fluids because coefficient of traction diminishes with increasing velocity.

The following table presents coefficient of traction data for a number of fused ring compounds. Test conditions were as recited above. The percentage improvement over the maximum nominal prior art coefficient of 0.060, as measured by the thrust bearing machine, is also shown. This table is intended to be illustrative only, and does not include all of the compounds or classes taught by the present invention.

TABLE I

| Tractive Fluid | Coefficient of Traction | Percent Increase Over 0.060 |
| --- | --- | --- |
| Bicyclo(4,4,0)decane(cis); cis-decalin | 0.072 | 20 |
| Bicyclo(4,4,0)decane (cis and trans); cis- and trans-decalin | 0.064 | 7 |
| 2,3-dimethylbicyclo(4,4,0)decane; 2,3-dimethyl decalin | 0.064 | 7 |
| x-(1-methylethyl)bicyclo(4,4,0)decane; isopropyldecalin | 0.067 | 12 |
| x-(1,1-dimethylethyl)bicyclo(4,4,0)decane; t-butyldecalin | 0.063 | 5 |
| Perhydrofluorene | 0.080 | 33 |
| Perhydrophenanthrene | 0.074 | 23 |
| x,x,x-Trimethylpentacyclo[6,5,1,1$^{2,6}$,0$^{2,7}$,0$^{9,13}$]tridecane; perhydromethylcyclopentadiene (trimer) | 0.069 | 15 |
| Perhydrofluoranthene | 0.067 | 12 |
| 6-cyclohexyl-6,8,8-trimethylbicyclo(4,3,0)nonane; 1-cyclohexyl-1,3,3-trimethylhydrindane | 0.074 | 23 |
| x-Hexylperhydrofluoranthene | 0.058 | −3 |
| x-Cyclohexylperhydrofluoranthene | 0.069 | 15 |
| Poly(ethyl-1-methyl)perhydrofluoranthene | 0.066 | 10 |
| x-Isopropylperhydrofluoranthene | 0.066 | 10 |
| Perhydrofluorene-x-cyclohexyl | 0.067 | 12 |
| Perhydrofluorene-x-isododecyl | 0.062 | 3 |
| 2-cyclohexyl bicyclo(4,4,0)decane; 1-cyclohexyl-decalin | 0.064 | 7 |
| 2-(cyclohexyl-x-methyl)bicyclo(2,2,1)heptane | 0.066 | 10 |
| Perhydropyrene | 0.057 | −5 |
| Ethylperhydrofluorene | 0.065 | 9 |
| Perhydroanthracene | 0.064 | 7 |
| Bis 2-decalin | 0.065 | 9 |
| 1,2'-dihydrindane | 0.065 | 9 |
| Perhydrocyclopentadiene trimer | 0.078 | 24 |
| 1-cyclohexyldecalin | 0.063 | 5 |
| 2-cyclohexyldecalin | 0.064 | 7 |
| 4,5-methyleneperhydrophenanthrene | 0.065 | 9 |

From the data of Table I it is evident that the tractive fluids of the present invention are useful for the purposes described. In particular, it is evident that those compounds having from 2 to about 5 fused rings are outstanding tractive fluids which provide the opportunity for tractive drives having significantly increased torque capacity. Accordingly, those tractive fluids having from 2 to 5 fused rings constitute a preferred class herein.

To demonstrate the outstanding properties of these compounds in a test machine in which the size of the tractive elements and the amount of torque transmitted by these elements approximate those of a practical device, three fluids selected from the list in Table I were compared with three leading commercial tractive drive fluids in a rolling disc machine. This machine, which was designed to predict the performance of a fluid in variable speed gears, comprises two hardened steel rollers which may be loaded one against the other and driven at any required speed. The fluid is introduced between the rollers and the relationships between applied load, roller surface speeds, relative sliding speed between the two rollers, and torque transmitted from one roller to the other through the contact between them, are a measure of the potential performance of the fluid in a variable speed gear. Literature references on this rolling disc machine include M. A. Plint [Proceedings of the Inst. of Mech. Engrs., vol. 180, pp. 225, 313 (1965–66)]; "The Lubrication of Rollers, I" by A. W. Crook [Phil. Trans A250,-387 (1958)]; and "The Lubrication of Rollers, IV, Measurements of Friction and Effective Viscosity" by A. W. Crock [Phil. Trans. A225,281 (1963a)].

The two test rollers, of 1% chromium ball bearing steel, are carried at the ends of shafts running in heavy duty ball and roller bearings. The rollers, which are hardened to 62 to 65 Rockwell C, having a diameter of 6 in. and are crowned to a radius of 3 in. to give a circular contact zone. The rollers are loaded together by dead weights acting through levers of 10:1 ratio, the upper roller bearings being carried in a sliding housing. The roller shafts are connected by flexible couplings to a spur gearbox having interchangeable pick-off gears. By changing the gear ratio, tangential slip may be introduced between the roller surfaces and power may be transmitted from one to the other. The lower shaft of the gearbox is driven by an electric motor by way of a toothed belt, the motor being mounted on trunnions to permit measurement of the input torque to the machine. The gearbox is also mounted on trunnions and the torque reaction of the gearbox, measured by an arm and a spring balance, is related to the torque transmitted between the rollers. A dashpot, required for certain tests exhibiting marked instability, may be connected to the gearbox torque arm. The rollers are enclosed in a polymethyl methacrylate casing and the oil sample under examination, amounting to about 100 cc., is contained in the casing, the lower roller dipping into it. Roller surface temperature is indicated by a Chromel-Alumel thermocouple carried on the end of a leaf spring and bearing lightly against the rim of the lower roller, while a further thermocouple indicates the temperature of the oil sample in the casing.

The driving speed and gear ratio are selected to give the required rolling and sliding speeds and the machine is run for 6 to 8 minutes with a load applied to the rollers of about ⅛ of the full test load; this insures that the bearings are warmed up and that parasitic losses reach a steady value. Readings of the various torques and temperatures are then taken with all load removed from the rollers and at five different loads between minimum and maximum, and finally a recheck is taken of torques with all load removed from the rollers.

Above a certain minimum speed the coefficient of traction is a function of the sliding velocity, e.g., the difference in velocities of the two roller surfaces, and is essentially independent of load and the mean velocity of the roller surfaces. In a practical variable speed transmission, the rates of sliding that are of significance in the transmission of power usually range from approximately 1 in./sec. up to 50 in./sec. For comparative purposes, therefore, the best criterion of the tractive capacity of a fluid is the average value of the coefficient of traction over this said range of sliding.

The average value of the coefficient of traction from rolling disc data is obtained by statistical techniques from the coefficient of traction values of a fluid over a range of loads, mean surface velocities and sliding velocities.

The three leading tractive drive fluids used in the rolling disc test for comparison with fused ring compounds of the present invention are identified as Fluid "A," Fluid "B" and Fluid "C." Fluid "A" is a synthetic paraffinic hydrocarbon with a viscosity of 45 cs. at 100° F. and 6.7 cs. at 210° F. Fluid "B" is a napthenic based oil with a viscosity of 47 cs. at 100° F. and 6.6 cs. at 210° F. Fluid "C" is a mineral oil with similar viscosity characteristics. The fused ring compound identified as Fluid "D" is perhydromethylcyclopentadiene trimer, as Fluid "E" is perhydrofluorene, and as Fluid "F" is 1-cyclohexyl1-1,3,3,-trimethylhydrindane.

Table II below presents the results of this comparative test wherein the superiority of the fused ring compounds of the present invention is readily apparent. All data are referred to a fluid temperature of 160° F. and a Hertz stress of 224,000 p.s.i. The coefficient of traction is the average coefficient over a range of sliding speed of from 1 in./sec. to 50 in./sec. and mean surface velocities of from 770 ft./min. to 4,640 ft./min.

TABLE II.—ROLLING DISC TEST RESULTS

| | Average Coefficient of Traction at 160° F. | Percent Increase Over Fluid "A" |
| --- | --- | --- |
| Fluid A | 0.069 | |
| Fluid B | 0.054 | −22 |
| Fluid C | 0.065 | −6 |
| Fluid D | 0.091 | +32 |
| Fluid E | 0.082 | +19 |
| Fluid F | 0.079 | +15 |

To demonstrate an improved coefficient of traction in a representative mechanical device, the tractive fluid identified hereinbefore as Fluid "F" was tested in a double toroidal variable speed drive designed for use as an automotive transmission. A dynamometer test stand adapted to measure coefficient of traction was employed for this test.

For comparison, the leading commercial tractive fluid identified hereinbefore as Fluid "A" was evaluated under identical test conditions.

Table III below presents the results of this comparative test wherein the superiority of the fused ring compound of the present invention (Fluid "F") is readily apparent. All data in Table III were taken at 200° F. fluid temperature and the rolling velocity was varied from 1000 to 3000 ft./min. at normal loads of 5000 and 15,000 lbs.

TABLE III.—DYNAMOMETER TEST RESULTS
[Coefficient of traction at 200° F.]

| | 5,000 Lb. Normal Load | | | 15,000 Lb. Normal Load | | |
|---|---|---|---|---|---|---|
| | 1,000 ft./min. | 2,000 ft./min. | 3,000 ft./min. | 1,000 ft./min. | 2,000 ft./min. | 3,000 ft./min. |
| Fluid A | .051 | .047 | .045 | .052 | .045 | .039 |
| Fluid F* | .067 | .063 | .062 | .063 | .057 | .053 |

*1-cyclohexyl-1,5,3-trimethylhydrindane.

The following examples describe in detail the method of preparing some representative tractive fluids with fused ring structure. In general, the fluids of this invention can be prepared by standard organic synthesis methods known to those skilled in the art. For example, many of the fluids disclosed in this invention were prepared by catalytic reduction of an appropriate aromatic or olefinic intermediate. While some of these intermediates can be isolated from coal tar or petroleum, others were prepared by acid catalyzed-alkylation of an appropriate aromatic substrate with an olefin. Still others were prepared by acid catalyzed dimerization of aromatic olefins and by the Diels-Alder condensation of cyclic olefins and diolefins.

EXAMPLE 1

*Perhydrophenanthrene.*—A mixture of 2300 g. of phenanthrene, 230 g. of 65% nickel-on-kieselguhr catalyst and 3000 ml. of n-hexane was hydrogenated in a 3-gallon stirred autoclave. Reduction commenced at 140° C. and an initial hydrogen pressure of 2400 p.s.i.g. The hydrogenation was continued at 170° C. with a hydrogen pressure of 800–2300 p.s.i.g. and finally at 250° C. with a hydrogen pressure of 1500–2800 p.s.i.g. The catalyst was removed by filtration, and the hexane was removed by distillation. The reduced hydrocarbon was distilled through a 2 cm. by 90 cm. packed column; B.P. 73° C. (0.4 mm.) to 85° C. (0.55 mm.). The yield of perhydrophenanthrene was 2087 g., $n_D^{20}$ 1.5030, $n_D^{25}$ 1.5008, $d_4^{20}$ 0.9458.

*Analysis.*—Calculated for $C_{14}H_{24}$: C, 87.4; H, 12.6. Found: C, 87.3; H, 12.5.

The viscosity of this tractive fluid, as measured per ASTM method D445-61, was 5.41 cs. at 100° F. and 1.81 cs. at 210° F. The coefficient of traction was 0.074 as measured with the thrust bearing test machine.

EXAMPLE 2

*2-ethylperydrofluorene.*—A mixture consisting of 2900 g. (14.0 moles) of 2-acetylfluoroene, 290 g. of 65% nickel-on-kieselguhr catalyst, and 2000 ml. of n-hexane was hydrogenated under high pressure in a 3-gallon stirred autoclave. Reduction began at 160° C. with an initial hydrogen pressure of 2000 p.s.i.g., and was continued at 220° C. After removal of the catalyst by filtration and the solvent by distillation, the residue was distilled under reduced pressure through a 3 x 90 cm. packed column to yield 1877 g. (65% yield) of 2-ethylperhydrofluorene; B.P. 110° C. (3.0 mm.), 113° C. (2.5 mm.) $n_D^{20}$ 1.4904; $d_4^{20}$ 0.918.

*Analysis.*—Calculated for $C_{15}H_{26}$: C, 87.3; H, 12.7. Found: C, 87.5; H, 12.5.

The viscosity of this tractive fluid was 5.16 cs. at 100° F. and 1.71 cs. at 210° F. The coefficient of traction was 0.065, as measured with the thrust bearing test machine.

Example 3

*1-cyclohexyl - 1,3,3 - trimethylhydrindane.*—This compound was obtained by a two-step process, viz, by the preparation of 1-phenyl-1,3,3-trimethylindane, and by the high pressure reduction thereof.

*Step I.*—(Preparation of 1 - phenyl-1,3,3-trimethylindane.) Concentrated sulfuric acid (5825 ml.) was added slowly to 8740 g. of cracked ice contained in a 50-liter reaction flask, equipped with paddle stirrer, long stemmed thermometer, thermocouple, dropping funnel and reflux condenser. The solution was cooled to room temperature and 2893 g. (24.5 moles) of α-methylstyrene was added quickly. The mixture was stirred vigorously and heated under reflux (132° C.) for four hours. Without interrupting the stirring or heating, a further 1500 ml. of concentrated sulfuric acid was added at the rate of 20 ml./minute. Refluxing (144° C.) was continued for twelve hours.

The reaction mixture was allowed to cool, and the green aqueous layer was removed by siphoning from below the white solid organic material. The latter was dissolved in ether, washed with water and dilute sodium bicarbonate solution until neutral, and then dried over anhydrous calcium chloride. The ether was removed at atmospheric pressure and the product distilled at reduced pressure through a Vigreux column. Redistillation from sodium gave the product as a white crystalline solid, M.P. 52° C., B.P. 144° C. (9 mm.). Yield 2516 g. (87%).

*Step II.*—A mixture consisting of 2516 g. (10.7 moles) of 1-phenyl-1,3,3-trimethylindane, 252 g. of 65% nickel-on-kieselguhr catalyst, and 3500 ml. of n-hexane was charged into a 3-gallon stirred autoclave. Reduction began at 90° C. and at an initial hydrogen pressure of 2500 p.s.i.g. Hydrogen absorption was quantitative. The catalyst was removed by filtering and the solvent by distillation. The product was distilled at reduced pressure through a 2.3 x 92 cm. spinning band column. The product (1-cyclohexyl-1,3,3-trimethylhydrindane) was a water white liquid, B.P. 118° C. (0.6 mm.), 122° C. (0.8 mm.), $n_D^{20}$ 1.5055, $d_4^{20}$ 0.944; yield 2263 g. (85.5%).

The viscosity of this tractive fluid was 31.49 cs. at 100° F. and 4.16 cs. at 210° F. The coefficient of traction was 0.074, as measured with the thrust bearing test machine.

Example 4

*2,3-dimethylbicyclo(4,4,0)decane; 2,3 - dimethyldecalin.*—After an attempted reduction of dimethylnaphthalene, freshly distilled from sodium, failed to give the fully reduced product, the partially reduced product was again distilled from sodium under reduced pressure, B.P. 55° C. (1.5 mm.) to 88° C. (0.8 mm.). Evidence of partial reduction was obtained by taking refractive indices of the cuts ($n_D^{20}$ 1.5092 to $n_D^{20}$ 1.5412). A mixture of 2239 g. of the partially-reduced dimethylnaphthalene, 224 g. of 65% nickel-on-kieselguhr catalyst, and 3000 ml. of n-hexane contained in a 3-gallon stirred autoclave was finally hydrogenated when reduction commenced at 137° C. and an initial hydrogen pressure of 2200 p.s.i.g. Reduction continued at 125–150° C. under a hydrogen pressure of 1500–2200 p.s.i.g.

After removal of the catalyst by filtration and the solvent by distillation, the mixture of dimethyldecalins was fractionated through a 3 x 90 cm. packed column. The product, B.P. 90° C. (20 mm.) to 126° C. (18 mm.) was collected at a reflux ratio of 10:1. The yield of dimethyldecalin was 1837 g., $n_D^{20}$ 1.4755, $d_4^{20}$ 0.8815.

*Analysis.*—Calculated for $C_{12}H_{22}$: C, 86.7; H, 13.3. Found: C, 87.2; H, 12.7.

The coefficient of traction of this compound was 0.064, as measured with the thrust bearing test machine.

Example 5

*Perhydrocyclopentadiene trimer.*—Cyclopentadiene dimer (1.5 kg., 11.3 moles) was heated for 16 hours at 155° C. in a 3 l. autoclave according to the procedure described by Staudinger and Bruson, Ann., 447, 97–110 (1926). The cooled reactants were collected and the autoclave washed with 400 ml. of methylcyclohexane. The combined washings and reactants were concentrated in vacuo and 200 g. selected for preliminary examination. Approximately 75% of this distillate was cyclopentadiene dimer (B.P. 60°/0.25 mm.) and the higher boiling distillate (B.P. 92°/0.25 mm.) showed both cyclopentadiene dimer as well as the desired cyclopentadiene trimer upon V.P.C. analysis. Therefore, approximately 400 g. of cyclopentadiene dimer was distilled from the crude reaction mixture under vacuum and the remaining material hydrogenated as isolation of the trimer was exceedingly difficult because of its thermal instabilty reforming dimer and monomer. Cyclopentadiene dimer and trimer mixture (900 g.), 25 g. of 5% rhodium-on-carbon and 250 ml. of methylcyclohexane were hydrogenated at 1600 p.s.i. (100° C.) over an 1.5 hr. period in a 2 l. autoclave. The reduction was completed at 160° C. (2800 p.s.i.) for 2 hrs., the reactants cooled, filtered and the filtrate concentrated in vacuo. Twenty-nine fractions were collected boiling from 75–100°/0.05 mm. of which fraction 25 to 29 inclusive were collected as the desired hydrocarbon. V.P.C. analysis of these fractions (M.P. 31° C.) showed one major component, B.P. 95–100°/0.05 mm. (155 g., 14% yield). NMR analysis of perhydrocyclopentadiene trimer showed no detection of vinylic protons.

*Analysis.*—Calculated for $C_{15}H_{22}$: C, 89.04; H, 10.96, mol. wt. 202.3. Found: C, 89.08; H, 11.02; mol. wt. 201.

The viscosity of this tractant, as measured per ASTM method D445–61, was 23.21 cs. at 100° F. and 4.292 cs. at 210° F. The coefficient of traction was 0.078, as measured in the rolling disc test machine.

Example 6

*Bis 2-decalin.*—Commercially purchased 2,2′-binaphthyl (250 g., 0.98 mole), 15 g. of 5% rhodium-on-carbon catalyst and 800 ml. of methylcyclohexane were charged to a 2-liter autoclave, flushed three times, pressurized to 1200 p.s.i. and tested for leaks. The material was heated to 80° C., 2000 p.s.i., where exothermic hydrogenation set in. The rate of hydrogenation was controlled by feed-ins from drops to 1000 p.s.i. to increases of 2000 p.s.i. Most of the reduction was carried out at 100–125° C. over a period of two hours at these pressures. After this treatment, the reactants were heated to 200° C., 3000 p.s.i. for 6 hours to insure complete reduction. The cooled reaction mixture was filtered, excess solvent removed in vacuo and the concentrates distilled under vacuum, B.P. 130–155° C./0.02 mm. This water-white liquid was free of any trace of unsaturation as evidenced by NMR analysis.

The viscosity of this tractant, as measured per ASTM method D445–61, was 251.8 cs. at 100° F. and 11.02 cs. at 210° F. The coefficient of traction was 0.065, as measured in the thrust bearing test machine.

Example 7

*4,5-methyleneperhydrophenanthrene.*—4,5 - methylenephenanthrene (100 g., 0.52 mole), 10 g. of 5% rhodium-on-carbon catalyst and 800 g. of methylcyclohexane were charged to a 2-liter autoclave, flushed three times, pressurized to 1200 p.s.i. and tested for leaks. The material was heated to 75° C., 1700 p.s.i., where exothermic hydrogenation set in. The rate of hydrogenation was controlled by feed-ins from drops to 1000 p.s.i. to increases of 2000 p.s.i. Most of the reduction was carried out at 110° C. over an hour's period of time at these pressures. After this treatment, the reactants were heated to 210° C., 4000 p.s.i., for 5 hours to insure complete reduction. The cooled reaction mixture was filtered, excess solvent removed in vacuo and the concentrates distilled under vacuum, B.P. 93° C./0.04 mm. This white solid, a "slush" at room temperature, was free of any trace of unsaturation as evidenced by NMR analysis.

The viscosity of this tractant, as measured per ASTM method D445–61, was 2.683 cs. at 210° F. and 0.835 cs. at 400° F. The coefficient of traction was 0.071, as measured in the rolling disc test machine.

An outstanding feature of the present invention is the utilization of mixtures of various compounds as tractive fluids. It is thus possible to approach optimum properties in a tractive fluid through judicious selection of the compounds to be mixed. Viscosity is an important property in certain tractive applications. For example, in automotive tractive transmissions, desired viscosity properties for a tractive fluid call for a minimum viscosity of 5.0 cs. at 210° F. and a maximum viscosity of 1800 cs. at 0° F., as measured per ASTM method D445–61. It has been found, however, that many compounds which have high coefficients of traction, but which are deficient in viscosity characteristics, can still be utilized as tractive fluids. For example, a compound with excess viscosity at low temperature can be made part of a carefully selected mixture to achieve the desired degree of viscosity reduction, i.e., provide a composition having a suitable pour point. Similarly, compounds or mixtures which are low in viscosity can be brought up to desired specifications with viscosity index (VI) improvers.

There are many VI improvers suitable for use with these tractive fluids. Successful results have been obtained with polyalkyl methacrylates resulting from the polymerization of alkyl methacrylates in which the alkyl groups may have from about 2 to 16 carbon atoms and may be, for example, ethyl, propyl, butyl, amyl, hexyl, etc., and mixtures thereof. The alkyl groups may be mixtures such as derived from a mixture of alcohols, and in which case there may be included some alkyl groups having as low as 1 carbon atom and as high as about 18 carbon atoms. The number of carbon atoms in the alkyl group should be such that the polymer is compatible with the particular fluid being improved. The alkyl group is preferably a normal alkyl group, but may be a branched chain or cycloalkyl group. The molecular size of the polyalkylmethacrylate should be great enough to increase the viscosity of the formulated base stock, yet small enough to be compatible therewith.

One example of a suitable VI improver for use with tractive fluids is a copolymer of butyl and lauryl methacrylate with a molecular weight of about 40,000. Another example is a terpolymer of butyl methacrylate, lauryl methacrylate, and vinyl pyrrolidone wherein the molecular weight is about 40,000. Still another VI improver is polyisobutylene prepared by acid-catalyzed polymerization of isobutylene up to a molecular weight between 20,000 and 40,000. Another is polyalkylstyrene prepared by polymerization of alkylstyrene, where the alkyl group is preferably lauryl, and the molecular weight is 45,000 to 50,000. Yet another VI improver useful in the present invention is a copolymer of vinyl acetate and alkyl fumarate having a molecular weight between 40,000 and 60,000.

The following example illustrates the degree of viscosity improvement attainable with a typical tractive fluid of the present invention. A commercially available VI improver was employed in a 3% by volume amount. The permissible concentration of a VI improver herein can vary considerably, and the amount to be chosen is naturally a function of the desired degree of viscosity change. A concentration of 1% by volume was tested in the compound of the following example prior to the 3% by volume test, although the results of the former are not presented. A practical range of VI improver addition for tractive fluids of the present invention is from about 0.3% to about 10% by volume, based on the fluid base stock.

Example 8

Perhydrofluoranthene had an initial viscosity of 9.70 cs. at 100° F. and 2.59 cs. at 210° F., and a VI of 111 by ASTM method D567–53. To the base stock was added 3% by volume of a commercial VI improver. The VI improver comprised a copolymer of butyl methacrylate and lauryl methacrylate having a molecular weight range from about 80,000 to about 100,000, and wherein the lauryl group was a mixture of $C_{10}$ to $C_{18}$ normal chains. The resulting composition had a viscosity of 38.69 cs. at 100° F. and 10.21 cs. at 210° F. and a VI of 169.

It has been shown above how the viscosity properties of tractive fluids can be altered by using VI improvers. It is also possible to alter the tractive properties of the fluids of this invention, an effective method being through use of mixtures. It has been found that, in general, the coefficient of traction of a mixture is approximately equal to the sum of the products of the coefficient and concentration of the respective components. This relationship is illustrated by the formula $$f_t = f_{t1}C_1 + f_{t2}C_2 \ldots + f_{tn}C_n$$

where $f_t$=coefficient of traction of the mixture; $f_{t1}$, $f_{t2}$ and $f_{tn}$=individual coefficients of traction of the components; and $C_1$, $C_2$ and $C_n$=the respective concentrations of the components within the mixture.

Thus, in arriving at a formulation for a given tractive fluid application, it may be desirable to include one or more compounds which produce certain advantageous physical properties, but happen to be deficient in coefficient of traction. By employing the formula above, it is possible to determine the extent to which the coefficient of traction of the base stock will be reduced by inclusion of such additives. Thereupon, it may be advisable to augment the base stock by blending therewith a quantity of another base stock having yet a higher coefficient of traction. Through the use of mixtures, therefore, broad scope can be achieved in controlling the properties of the tractive fluids of this invention.

The fused ring compounds of the present invention may contain various substituents, numerous examples of which were hereinbefore cited. Among the alkyl and cycloalkyl substituents considered, the following have been found to be particularly useful: isopropyl, diisopropyl, cyclopentyl, methylcyclopentyl, and cyclohexyl. Illustrative compounds of this type useful as tractive fluids are mono-, di-, and triisopropylperhydrophenanthrene, methylcyclopentylperhydrophenanthrene, and cyclohexylperhydrofluorene.

While this invention has been described with respect to specific examples and embodiments, it is to be understood that the invention is not limited thereto and that it can be variously practiced within the scope of the following claims.

The embodiments of this invention in which an exclusive property or privilege is claimed are defined as follows:

1. A method for improving the coefficient of traction between relatively rotatable members in torque transmitting relationship which comprises introducing to the tractive surfaces of said members a fused, saturated compound having from 2 to 9 fused rings and a total carbon atom content of from about 9 to about 60, up to 8 of which atoms can be replaced by atoms selected from the group consisting of oxygen, nitrogen, phosphorus and silicon.

2. A method of claim 1 wherein the compound has from 2 to 5 fused rings and a total carbon atom content of from about 9 to about 36.

3. A method of claim 1 wherein the compound contains a substituent selected from the group consisting of isopropyl, diisopropyl, cyclopentyl, methlcyclopentyl and cyclohexyl.

4. A method of claim 1 wherein the compound has a coefficient of traction of at least about 0.06.

5. A method of claim 1 wherein the compound is decalyl.

6. A method of claim 1 wherein the compound is 1,2'-dihydrindane.

7. A method of claim 1 wherein the compound is perhydrophenanthrene.

8. A method of claim 1 wherein the compound is perhydrofluorene.

9. A method of claim 1 wherein the compound is perhydrofluoranthene.

10. A method of claim 1 wherein the compound is perhydroacenaphthene.

11. A method of claim 1 wherein the compound is cyclohexyldecalin.

12. A method of claim 1 wherein the compound is perhydrocyclopentadiene trimer.

13. A method of claim 1 wherein the compound is methyleneperhydrophenanthrene.

14. A method of claim 1 wherein a mixture of two or more of such fused, saturated compounds is introduced to the tractive surfaces.

15. A method of claim 3 wherein the compound is isopropylperhydrophenanthrene.

16. A method of claim 3 wherein the compound is cyclohexylperhydrofluorene.

17. A method for improving the coefficient of traction between relatively rotatable members in torque transmitting relationship which comprises introducing to the tractive surfaces of said members a fused, saturated compound having from 2 to 9 fused rings and a total carbon atom content of from about 9 to about 60, up to 8 of which atoms can be replaced by atoms selected from the group consisting of oxygen, nitrogen, phosphorus and silicon, said compound having added thereto a VI improver in an amount effective to improve the viscosity index thereof.

18. A method of claim 17 wherein the VI improver is a polyalkylmethacrylate composition, containing an average of from about 4 to about 12 carbon atoms in the alkyl group, and is present in an amount of from about 0.3 to about 10 percent by volume based on the compound base stock.

19. A tractive drive having at least two relatively rotatable members in torque transmitting relationship, the tractive surfaces of said members having disposed thereon a fused, saturated compound having from 2 to 9 fused rings and a total carbon atom content of from about 9 to about 60, up to 8 of which atoms can be replaced by atoms selected from the group consisting of oxygen, nitrogen, phosphorus and silicon.

20. A tractive drive of claim 19 wherein the compound has from 2 to 5 fused rings and a total carbon atom content of from about 9 to about 36.

21. A tractive drive of claim 19 wherein the compound contains a substituent selected from the group consisting of isopropyl, diisopropyl, cyclopentyl, methylcyclopentyl and cyclohexyl.

22. A tractive drive of claim 19 wherein the compound has a coefficient of traction of at least about 0.06.

23. A tractive drive of claim 19 wherein the compound is decalyl.

24. A tractive drive of claim 19 wherein the compound is 1,2'-dihydrindane.

25. A tractive drive of claim 19 wherein the compound is perhydrophenanthrene.

26. A tractive drive of claim 19 wherein the compound is perhydrofluorene.

27. A tractive drive of claim 19 wherein the compound is perhydrofluoranthene.

28. A tractive drive of claim 19 wherein the compound is perhydroacenaphthene.

29. A tractive drive of claim 19 wherein the compound is cyclohexyldecalin.

30. A tractive drive of claim 19 wherein the compound is perhydrocyclopentadiene trimer.

31. A tractive drive of claim 19 wherein the compound is methyleneperhydrophenanthrene.

32. A tractive drive of claim 19 wherein a mixture of two or more of such fused, saturated compounds is disposed on the tractive surfaces.

33. A tractive drive of claim 21 wherein the compound is isopropylperhydrophenanthrene.

34. A tractive drive of claim 21 wherein the compound is cyclohexylperhydrofluorene.

35. A tractive drive having at least two relatively rotatable members in torque transmitting relationship, the tractive surfaces of said members having disposed thereon a fused, saturated compound having from 2 to 9 fused rings and a total carbon atom content of from about 9 to about 60, up to 8 of which atoms can be replaced by atoms selected from the group consisting of oxygen, nitrogen, phosphorus and silicon, said compound having added thereto a VI improver in an amount effective to improve the viscosity index thereof.

36. A tractive drive of claim 35 wherein the VI improver is a polyalkylmethacrylate composition, containing an average of from about 4 to about 12 carbon atoms in the alkyl group, and is present in an amount of from about 0.3 to about 10 percent by volume based on the compound base stock.

37. A tractive drive comprising an input toroidal disc and an output toroidal disc, a plurality of rollers in contiguity with said discs, loading means adapted to urge said discs against said rollers, ratio changing means adapted to vary the inclination of said rollers, and the tractive surfaces of said drive having disposed thereon a fused, saturated compound having from 2 to 9 fused rings and a total carbon atom content of from about 9 to about 60, up to 8 of which atoms can be replaced by atoms selected from the group consisting of oxygen, nitrogen, phosphorus and silicon.

No references cited.

C. J. HUSAR, *Primary Examiner.*